March 29, 1949.  J. B. MANGAN  2,465,543
WEED ERADICATING ATTACHMENT FOR LAWN MOWERS
Filed Feb. 6, 1945  3 Sheets-Sheet 1
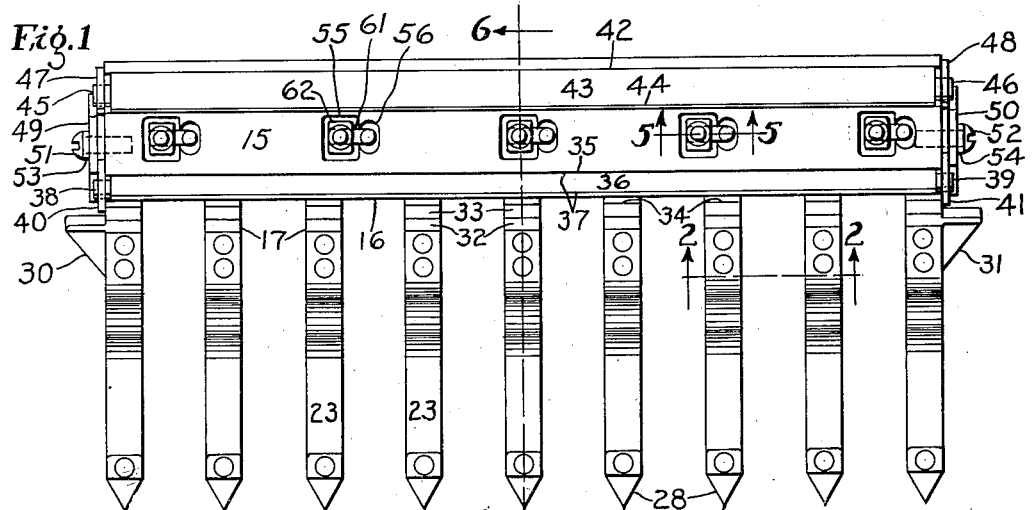
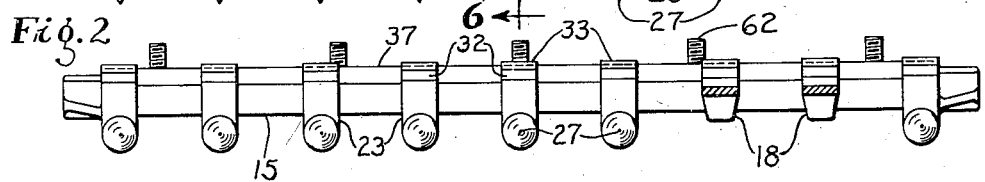
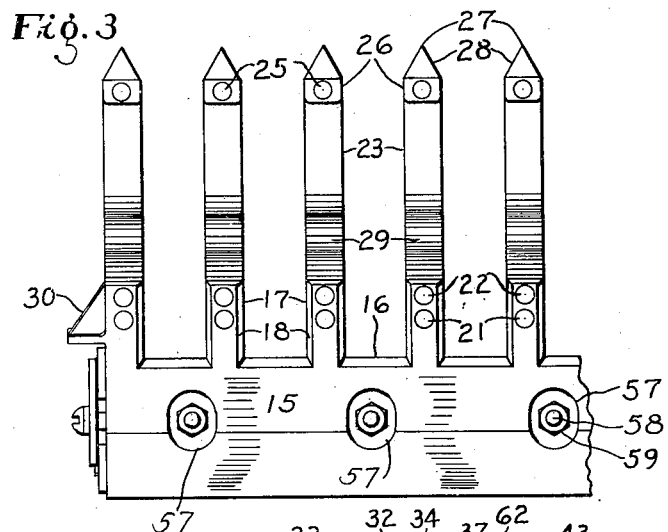
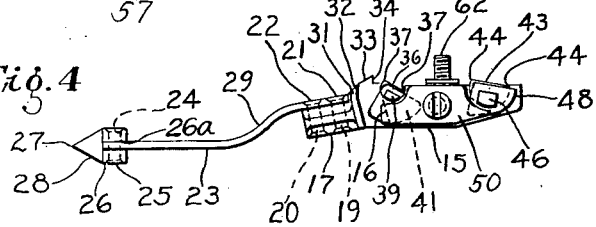
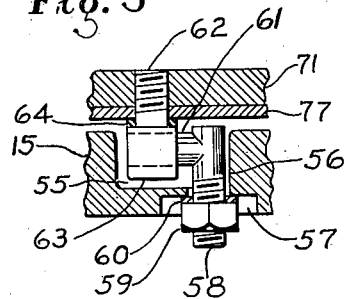
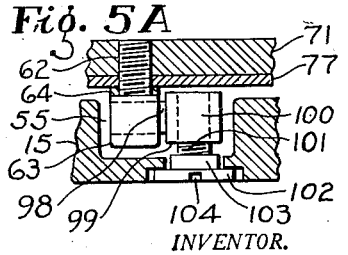
INVENTOR.
Joseph B. Mangan
BY
H. G. Manning March 29, 1949.     J. B. MANGAN     2,465,543
WEED ERADICATING ATTACHMENT FOR LAWN MOWERS
Filed Feb. 6, 1945     3 Sheets-Sheet 2

INVENTOR.
Joseph B. Mangan
BY
H. G. Manning

March 29, 1949. J. B. MANGAN 2,465,543
WEED ERADICATING ATTACHMENT FOR LAWN MOWERS
Filed Feb. 6, 1945 3 Sheets-Sheet 3
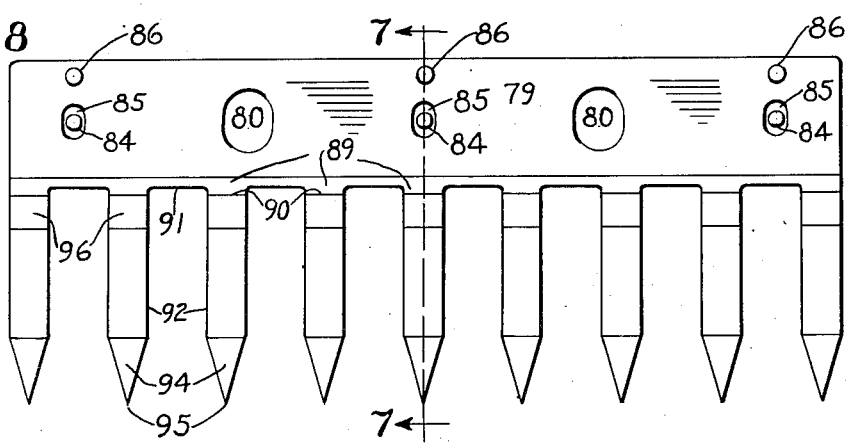
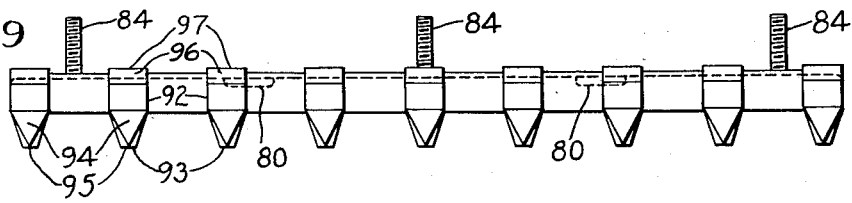
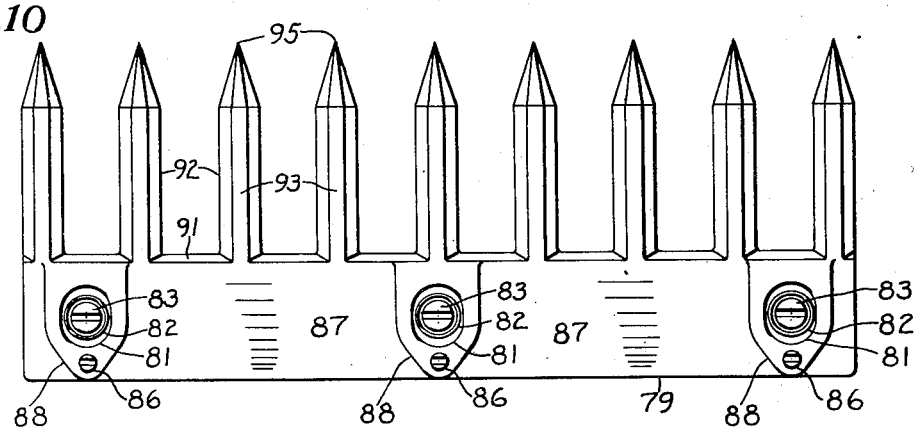
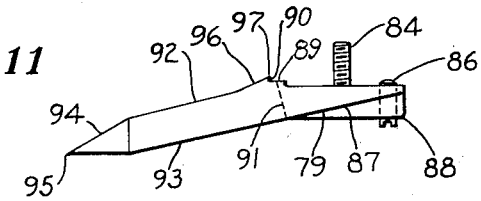
INVENTOR.
Joseph B. Mangan
BY Patented Mar. 29, 1949

2,465,543

UNITED STATES PATENT OFFICE 2,465,543

WEED ERADICATING ATTACHMENT FOR LAWN MOWERS

Joseph B. Mangan, Wethersfield, Conn.

Application February 6, 1945, Serial No. 576,380

11 Claims. (Cl. 56—249)

This invention relates to lawn care apparatus, and more particularly to an attachment for a conventional lawn mower for destroying and controlling low-lying weeds and obnoxious plants, while at the same time insuring that the grass will be mowed to a uniform height.

One object of this invention is to provide an attachment for lawn mowers which may be used for combing the lawn immediately preceding the grass mowing operation, so that the leaves and stems of the grass and weeds will be raised to and held in a vertical position and supported until cut off by the mower to a uniform length.

A further object of this invention is to provide an attachment of the above nature which will be applicable to various types and sizes of lawn mowers, both manual and power-operated, and which may either be installed in the lawn mower at the time of its manufacture, or attached thereto at a later time.

A further object of this invention is to provide an attachment of the above nature having adjustable means for detachably and adjustably securing it to the shear bar support of the lawn mower so that it will not drag on the ground or adversely affect the ground clearance of the shear bar.

A further object is to provide an attachment of the above nature having means for adjusting the working height of the comb teeth independently of the adjustment of the cutting height of the shear bar of the lawn mower.

A further object is to provide an attachment of the above nature having means for quickly and easily attaching it, as a unit, to the lawn mower without disturbing the relative positions of the various parts of said mower.

A further object is to provide an attachment of the above nature having a resilient means to permit the comb teeth to operate close to the turf even on rough and uneven ground.

A further object is to provide an attachment of the above nature which will be simple in construction, inexpensive to manufacture, easy to install and manipulate, compact, ornamental in appearance, and very efficient and durable in use.

With these and other objects in view there have been illustrated on the accompanying drawings two forms in which the invention may conveniently be embodied in practice.

In the drawings,

Fig. 1 represents a top plan view of the first form of the invention, showing the attachment unit by itself.

Fig. 2 is a front elevation of the same, showing two of the teeth in section, along the line 2—2 of Fig. 1, looking in the direction of the arrows.

Fig. 3 is a fragmentary bottom view of the same.

Fig. 4 is an end view of the same.

Fig. 5 is an enlarged fragmentary sectional view, taken along the line 5—5 of Fig. 1, and showing the method of attaching the comb to the shear bar support plate of a lawn mower.

Fig. 5a is a sectional view similar to Fig. 5 showing a modified method of attaching the comb to the shear bar support plate.

Fig. 8 is a top plan view of the modified form of attachment shown in Fig. 7.

Fig. 9 is a front elevation of the same.

Fig. 10 is a bottom view of the same.

Fig. 11 is an end view of the same.

Figure 6:
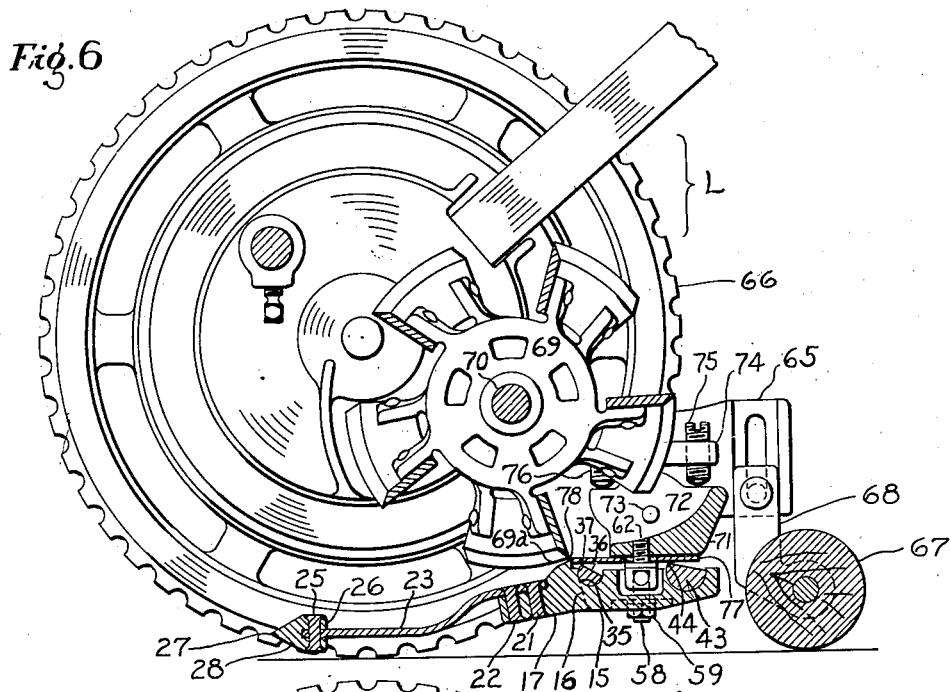
Fig. 6 is a sectional view, in side elevation, of the invention, taken along the line 6—6 of Fig. 1, looking in the direction of the arrows, and showing the appearance of the attachment when installed upon a lawn mower of conventional design.

Conventional lawn mowers as previously manufactured, do not maintain a lawn in perfect condition, because of the fact that the lawn grass and turf will be injured if the mower is adjusted low enough to cut the low-growing weeds such as crab grass, which are too low to be properly mowed when the shear bar is set at the proper height for obtaining the best growth of the grass.

It is well-known that the growth of grass and other leafy plants is largely dependent upon the photosynthetic activity of the leaves thereof, and this is proportional to the area of the leaves. Thus, grass plants which are mowed uniformly long, will develop a greater root system and take in more water and plant nutrients for the benefit of the grass, than those which are mowed at a lower height. On the contrary, weeds, such as dandelion, plantain, etc., which naturally have a large leaf area, may be eradicated if their large leaves and stems are cut off short and prevented from growing. Other undesirable obnoxious plants, such as crab grass and low prostrate weeds such as mallow and money-wort, which are dependent for their existence and perpetuation upon their vine-like growth and/or the production of seeds, may also be controlled and eventually destroyed and removed from the lawns if their branches and seed heads are prevented from developing.

Referring now to the drawings in which like reference numerals denote corresponding parts throughout the several views, the first form of attachment embodying the present invention is provided with a comb bar 15, the length of which is approximately equal to the width of the swath cut by the lawn mower, the leading face 16 of said bar 15 being located rearwardly of the cutting edge of the shear bar 77 of the lawn mower, as will be hereinafter more fully described.

Integral with the comb bar 15, and extending forwardly therefrom, are a plurality of arms 17 (nine of which are herein shown) having tapered under sides 18 which are adapted to avoid the collection of debris in the spaces between said arms 17. Adjacent the forward end of each comb arm 17, provision is made of a pair of circular apertures 19, 20 which are adapted to receive rivets 21, 22 which also pass through a resilient spring finger 23, one of which is located on each of the arms 17. The rivets 21, 22 are provided with heads upon each end to securely hold the fingers 23 upon the arms 17.

Adjacent the forward end of each finger 23, provision is made of a circular vertical aperture 24 which is adapted to receive a headed vertical rivet 25, and is aligned with a pair of vertical apertures in a split fingertip 26. The fingertip 26 is provided with a horizontal slot 26a in its rear portion for embracing the finger 23, as shown in Fig. 4.

The finger tips 26 are also provided with conical forward extremities 27 having conical side surfaces 28 to enable the fingers to pass easily through the grass.

The fingers 23 are provided with upwardly inclined intermediate portions 29, which are adapted to pass under the grass and obnoxious weeds and raise the leaves and stems thereof to a substantially vertical position, and also to provide resiliency for said fingers.

Provision is also made of a pair of triangular ribbed end guards 30, 31 integral with the comb bar 15, which guards serve to deflect plants and leaves laterally away from the ends of said comb bar.

The arms 17 have inclined upper guiding surfaces 32 which extend rearwardly from the rear ends of the fingers 23 and merge into slightly inclined surfaces 33 of the comb bar 15, which latter surfaces terminate in shoulders 34 (see Fig. 4).

In order to permit the height of the fingers 23 to be readily adjusted whenever desired, provision is made of a horizontal semi-cylindrical groove 35 in the comb bar 15 located adjacent to and parallel with the leading face 16 thereof (see Fig. 6). The groove 35 is shaped to receive an elongated horizontal adjusting rod 36 which is approximately semi-cylindrical in cross section and has a pair of upper edges 37. The adjusting rod 36 has a pair of end lugs 38, 39 which are approximately triangular in shape and are adapted to fit into similarly-shaped apertures in a pair of retainer plates 40, 41 located at the ends of the attachment.

Another semi-cylindrical groove 42, parallel with the groove 35, is provided at the rear portion of the comb bar 15 for receiving a horizontal comb-height adjusting rod 43, which is approximately semi-cylindrical in cross-section and has its upper surface provided with edges 44. The rod 43 is provided with a pair of reduced end lugs 45, 46 which are substantially rectangular in shape and are adapted to fit into correspondingly-shaped apertures in a pair of end retainer plates 47, 48 which are substantially segment-shaped and are located beyond the ends of the shear bar plate 71 and the comb bar 15.

Provision is also made of a pair of common end clamp plates 49, 50 which are attached by screws 51, 52 to the comb bar 15 and are provided with lock washers 53, 54. The clamp plates 49, 50 serve to secure the retainer plates 40, 41 and 47, 48 in position.

The comb bar 15 is provided with a plurality of rectangular upper recesses 55 (five of which are herein shown), said recesses being in alignment with a corresponding number of tapped holes which are provided on the shear bar support plate 71 and corresponding apertures in the shear bar 77 thereof.

Each recess 55 has an elongated side aperture 56 which opens into an elongated recess 57 provided on the bottom surface of the comb bar 15 (see Fig. 5). A plurality of L-shaped bolts 58 are also provided, and have vertical shanks extending through the comb bar 15 which are retained in position by nuts 59 and lock washers 60 located in said recesses 57. Each bolt 58 also has a horizontal arm 61 which is slidably engaged in a horizontal circular hole of a head 63 of a stud 62. The stud 62 is provided with a lock washer 64 and passes upwardly through a vertical aperture in the shear bar 77 and is screwed into a tapped hole in the shear bar plate 71, as shown.

In Fig. 6 of the drawing, a conventional lawn mower L is shown provided with a frame 65, a pair of traction wheels 66, and a rear supporting roller 67 which is mounted upon a pair of vertically adjustable end brackets 68. The lawn mower L is also provided with a rotatable circular cutting blade assembly 69 carried by a horizontal shaft 70 mounted in the frame 65 and driven from the traction wheels 66 by suitable gearing, not shown.

The shear bar support plate 71 (as clearly shown in Fig. 6) is provided with a pair of upright end bracket members 72 which are apertured to engage a pair of horizontal pivot studs 73 which are supported by the frame 65 in the usual manner. The frame 65 also carries a pair of horizontal tapped lug members 74, 74 adjacent both ends of the shear bar plate 71, said tapped lug members 74, 74 being provided with the usual pair of vertical shear bar adjusting screws 75, 76. The shear bar 77 has a cutting edge 78 adapted to cooperate with the rotary cutting blades 69a of the assembly 69 in the usual manner.

In the modified form shown in Fig. 5a, the comb 15 is secured to the shear bar support plate 71 by the use of studs 62 having hollow rectangular heads 63 and washers 64 (as in the form shown in Fig. 5).

In the form shown in Fig. 5a, however, instead of employing an L-shaped bolt 58 as in Fig. 5, a special socket pin 99 having a cylindrical shank 98 which fits into the horizontal aperture of the stud 62 is provided. The pin 99 has a cubical head which is provided with a vertical tapped hole 100 for receiving a screw stud 101 having a stepped head 102 provided with a reduced shoulder 103. The head 102 has a kerf 104 for receiving a screw driver (not shown).

One advantage of this form of the invention is that the head 102 of the stud 101 lies flush with the bottom of the comb bar 15 without projecting below the same.

Operation

In the operation of the attachment shown in Figs. 1 to 6, all of the screws commonly furnished for attaching the shear bar 77 to the shear bar support 71 of the conventional lawn mower L are first removed and replaced by the special studs 62, which are so adjusted that the axes of the horizontal circular holes in the heads 63 thereof will be in alignment with a single plane parallel to the edge of the shear bar 77.

The attachment unit will then be connected to the shear bar plate 77 by means of the L-shaped bolts 58 and the nuts 59. The elongated slot 56 in the comb bar 15 will then permit lateral adjustment of the latter relative to the shear bar support plate 71 since the width of said slot is greater than the length of the head 63 and the arm 61. The various parts of the lawn mower will then be adjusted in the usual manner to suit the convenience of the operator.

The vertical position of the guide surfaces 33 of the comb bar 15 will then be adjusted by partially rotating the adjusting rod 36 by means of a screw driver blade (not shown) which may be placed between the top face of the end retainer plates 40, 41 and the bottom face of the shear bar 77. With the upper edge 37 of the adjusting rod 36 held firmly against the bottom face of the shear bar 77 which serves as a fulcrum point, the vertical position of the finger tip extremities 27 may then be adjusted by partially rotating the rear adjusting rod 43 which will serve to raise or lower the top edge 44 to the desired amount.

After the rods 36 and 43 have been adjusted, they will be held in fixed position by means of the plates 40, 41, the plates 47, 48, and the clamping plates 49, 50. The nuts 59 may then be tightened to hold the attachment securely in position on the lawn mower.

In use, as the lawn mower L is propelled forward over the turf in the usual manner, the fingertips 26 will skim over the ground at a predetermined height, and the points 27 will pass easily between and under the leaves and stems of the grass, weeds, and other plants. The inclined surfaces of the finger tips 26 and the fingers 23 will thus cause the stems and leaves to be raised and guided to the shear bar 77 where they will be cut off and thrown backwardly by the action of the rotary cutting blades 69a. The cuttings will be preferably collected in a grass catcher, not shown.

One advantage of the present invention is that any desired height of grass may be maintained independently of the vertical height of the weed eradicating comb bar fingers.

Modified form of comb bar with integral finger

In the lawn mower attachment shown in Figs. 7 to 11, a modified form of comb bar 79 is provided having a pair of elongated recesses 80, 80 which are located in alignment with and clear the heads of the usual low filister head shear bar holding screws, not shown.

Figure 7:
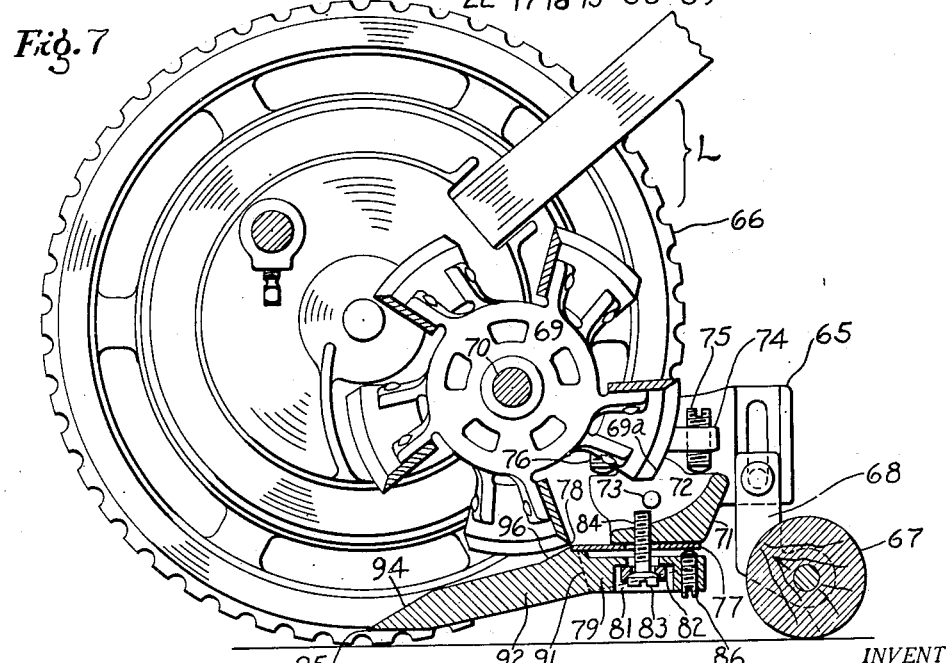
Fig. 7 is a similar sectional side view of a modified form of the invention, taken along the line 7—7 of Fig. 8, and showing it attached to a similar lawn mower.

In the present invention two of the filister head screws commonly employed are retained and function as usual. The other three of such screws are removed and the special screws and washers shown in Fig. 7 are substituted therefor. The comb bar 79 is provided in its under surface with three elongated recesses 81, 81, 81 to accommodate three collars 82, 82, 82, each of which has a spherical segment-shaped recess in its outer face to accommodate a correspondingly-shaped shoulder on the head 83 of the studs 84, 84, 84. The studs 84, 84, 84 extend through elongated slots 85 (Fig. 8) of the comb bar 79, and also pass through the shear bar 77 and engage in threaded holes in the shear bar support plate 71, as clearly shown in Fig. 7.

Provision is also made of a plurality of vertical adjusting screws 86, 86, 86 located in threaded holes in the rear portion of the comb bar 79, and having their upper ends abutting against the bottom face of the shear bar 77. The screws 86 are provided with screwdriver slots at their bottom ends so that they may be readily adjusted.

As clearly shown in Fig. 11, the comb bar 79 is provided with a wedge-shaped rear section 87 to provide maximum ground clearance under the shear bar 77. The comb bar 79 is also provided with three downwardly offset pads 88, 88, 88, which furnish extra strength and stiffness at the slotted portions of the comb bar 79. Provision is also made of a plurality of short horizontal pads 89 (Fig. 8) on the comb bar which abut against the shear bar 77 and cooperate with a shoulder 90 on said comb bar to rigidly locate the leading face 91 of the comb bar 79 with respect to the cutting edge of the shear bar 77.

The comb bar 79 is also provided with a plurality of inclined rigid non-resilient fingers 92 which are integral with said comb bar and extend forwardly from the front face 91 thereof. The fingers 92 are substantially wedge-shaped in cross section and are provided with relatively narrow bottom edges 93, as clearly shown in Fig. 9, which serve to prevent the accumulation of debris in the spaces between the fingers 92.

The forward extremities 94 of the fingers 92 are steeply inclined and are tapered to provide sharp points 95 as clearly shown in Fig. 11. This modified type of finger construction facilitates the forward movement of the comb attachment between and under the weeds and other plants.

The fingers 92 are provided with inclined rear surfaces 96 which terminate in edges 97 at the upper extremities of the shoulders 90. The inclined surface 96 and the edges 97 serve to provide means for smoothly guiding the leaves and stems of the plants to the shearing point 78 of the shear bar 77.

While there have been disclosed in this specification several forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new and for which it is desired to secure Letters Patent is:

1. In an attachment for raising obnoxious weeds into position to be cut by a lawn mower having a shear bar, a comb bar having a plurality of spaced apart, forwardly extending, downwardly-inclined resilient fingers having upper guide surfaces constructed to terminate adjacent the cutting edge of the shear bar of said mower, means to independently adjust the angle of inclination of said teeth relative to the ground level and the vertical position of said upper guide surfaces relative to said cutting edge, and means to secure said comb bar to said mower.

2. The invention as defined in claim 1, in which said fingers have detachable pointed hardened tips.

3. The invention as defined in claim 1, in which said fingers have pointed hardened tips.

4. The invention as defined in claim 1, in which said comb bar has end guards to deflect grass and leaves laterally as the lawn mower passes over the ground.

5. The invention as defined in claim 1, in which said comb bar is secured to the shear bar support plate of the lawn mower by a plurality of L-shaped bolts and eye studs.

6. The invention as defined in claim 1, in which said adjusting means comprises a pair of horizontal rods of semi-circular cross section, the edges of the flat portions of said rods engaging the undersurface of the shear bar along two lines, and means for rotating said rods around their axes.

7. The invention as defined in claim 1, in which said adjusting means comprises a pair of horizontal rods of semi-circular cross section, the edges of the flat portions of said rods engaging the undersurface of the shear bar along two lines, and means for independently rotating said rods around their axes.

8. The invention as defined in claim 1, in which said adjusting means comprises a pair of substantially continuous, elongated supporting members engaging the undersurface of said shear bar.

9. The invention as defined in claim 1, in which said adjusting means comprises a pair of substantially continuous, elongated supporting members engaging the undersurface of said shear bar, said supporting members being mounted in said comb bar.

10. The invention as defined in claim 1, in which said adjusting means includes a substantially continuous elongated supporting member engaging the undersurface of said shear bar.

11. The invention as defined in claim 1, in which said securing means comprises devices for detachably and adjustably securing said comb bar to said shear bar support plate including a plurality of headed studs, the heads of which are located flush with the surface of said comb bar.

JOSEPH B. MANGAN.

REFERENCES CITED

The following references are of record in the file of this patent:

UNITED STATES PATENTS

| Number | Name | Date |
|---|---|---|
| 682,824 | Tunny | Sept. 17, 1901 |
| 955,261 | Gooding | Apr. 19, 1910 |
| 1,497,242 | Martin | June 10, 1924 |
| 1,935,013 | Burcke | Nov. 14, 1933 |
| 2,020,851 | Nugen et al. | Nov. 12, 1935 |
| 2,246,880 | Erke et al. | June 24, 1941 |